United States Patent [19]

Pease

[11] 4,397,089
[45] Aug. 9, 1983

[54] STRAIGHT LINE GUIDE ON ELECTRIC POWER HAND SAW

[75] Inventor: Mason E. Pease, Pacific City, Oreg.

[73] Assignee: Andrew Mason Pease, Gresham, Oreg.

[21] Appl. No.: 228,879

[22] Filed: Jan. 26, 1981

[51] Int. Cl.³ .............................................. B27B 9/04
[52] U.S. Cl. ...................................................... 30/373
[58] Field of Search .................. 30/375, 371, 372, 374, 30/373; 144/136 C

[56] References Cited

U.S. PATENT DOCUMENTS

| | | | |
|---|---|---|---|
| 2,623,557 | 12/1952 | Kendall | 30/373 X |
| 2,676,624 | 4/1954 | Gecmen | 30/373 |
| 2,688,347 | 9/1954 | Schmidt | 30/373 |
| 3,043,351 | 7/1962 | Davis | 30/373 |
| 4,016,649 | 4/1977 | Kloster | 30/373 |
| 4,077,292 | 3/1978 | Cole | 30/372 |

Primary Examiner—Jimmy C. Peters
Attorney, Agent, or Firm—Lee R. Schermerhorn

[57] ABSTRACT

A guide bar has a pair of clamps for mounting on the shoe of an electric power hand saw. The guide bar is adjustable both longitudinally and laterally in relation to the saw. This arrangement facilitates trimming strips off the ends or side edges of wood panels wherein the width of such strips may vary from a small fraction of an inch to several inches.

5 Claims, 6 Drawing Figures

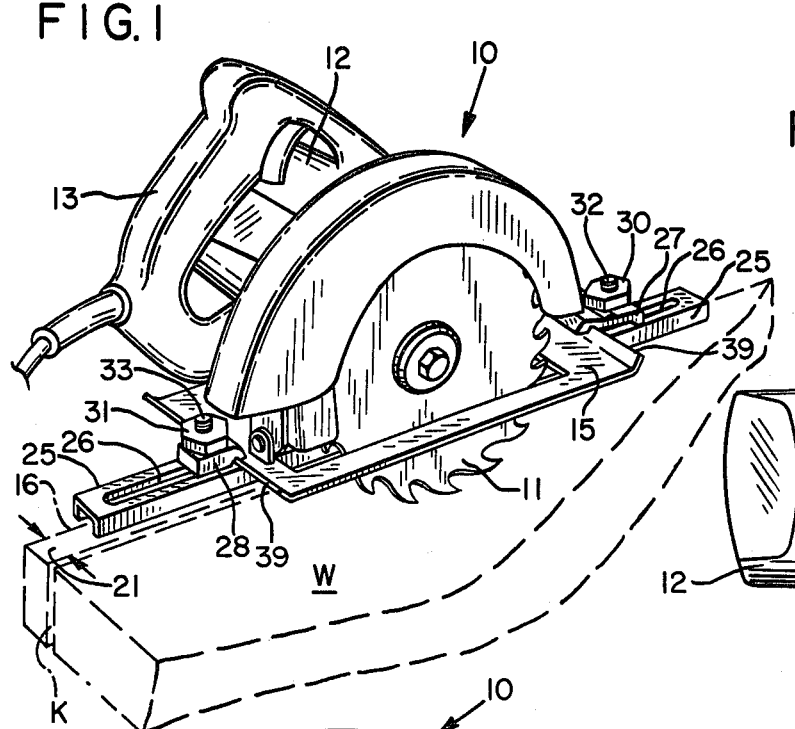
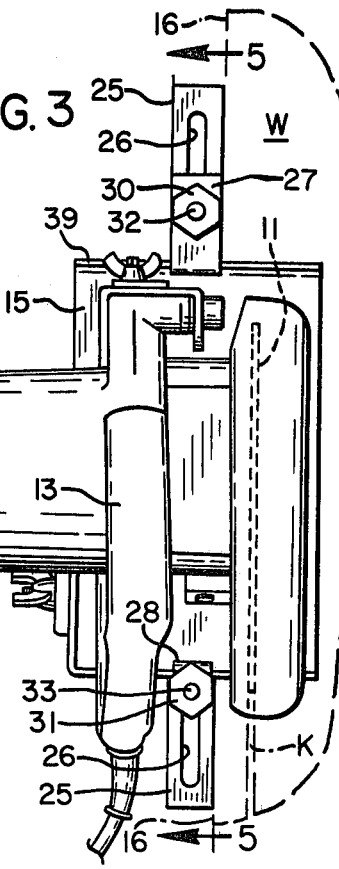
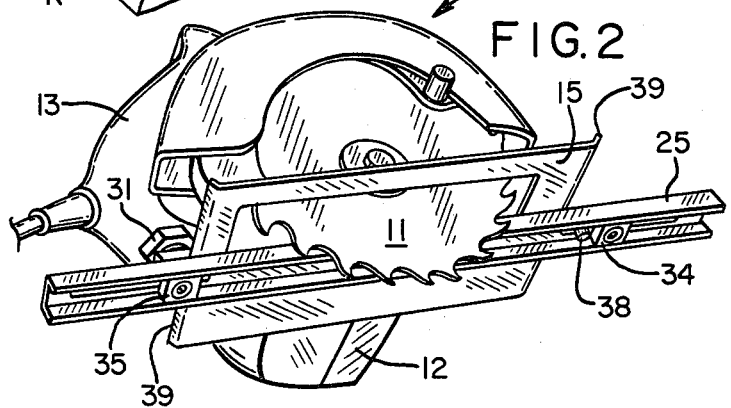
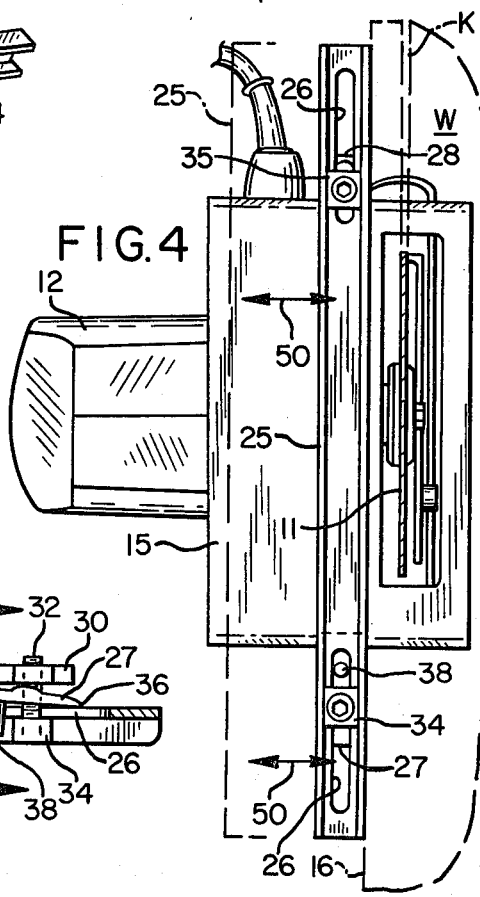
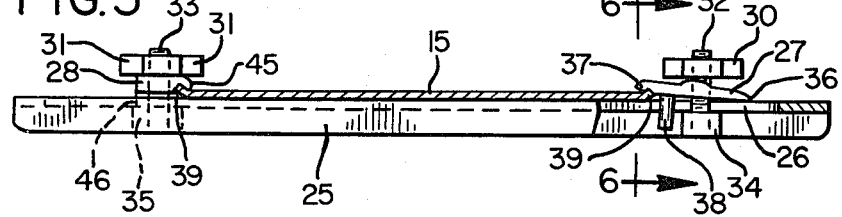

STRAIGHT LINE GUIDE ON ELECTRIC POWER HAND SAW

BACKGROUND OF THE INVENTION

This invention relates to a guide bar mounted on an electric power hand saw.

It has heretofore been the practice to guide the path of a movable power saw either by a track or guide rail on a work table or other facility which supports the workpiece, or by a guide rail mounted directly on the workpiece itself. Such arrangements are very useful for certain purposes but they are unnecessarily cumbersome and expensive for other purposes.

It is often necessary merely to trim a narrow strip off one or more straight edges of a wood panel. A common example of such an operation is the trimming of a fraction of an inch off the bottom of a door to prevent the door from scraping on the floor or to raise the bottom of the door when a carpet is installed on the floor. Previously known types of saw guides are not practical for this purpose.

SUMMARY OF THE INVENTION

According to the present invention a guide bar is installed as an attachment directly on the saw itself instead of on a work table or on the workpiece.

A common form of electric power hand saw has a flat shoe to support the saw in sliding movement on a face of a panel or other workpiece. The present device comprises a guide bar having a pair of clamps to mount the guide bar on the underside of the shoe in a position to overhang and confront one edge of the panel to be sawed. The clamps are adjustable lengthwise of the guide bar and are adjustable in their positions on the shoe to space the guide bar the desired distance from the cutting plane of the saw.

The invention will be better understood and additional objects and advantages will become apparent from the following detailed description of the preferred embodiment illustrated in the accompanying drawing. Various changes may be made in details of construction and arrangement of parts and certain features may be used without others. All such modifications within the scope of the appended claims are included in the invention.

BRIEF DESCRIPTION OF THE DRAWING

FIG. 1 is a perspective view of an electric power hand saw embodying the invention.

FIG. 2 is a perspective view showing the underside of the hand saw.

FIG. 3 is a top plan view.

FIG. 4 is a bottom plan view.

FIG. 5 is view on the line 5—5 in FIG. 3 showing the guide bar.

FIG. 6 is a view on the line 6—6 in FIG. 5

DESCRIPTION OF THE PREFERRED EMBODIMENT

The conventional power hand saw 10 has a circular saw blade 11 driven by an electric motor 12. The saw is manipulated by a handle 13. Such saws include as a part thereof a bottom shoe 15 to support the saw in sliding movement across a flat face of a workpiece W which for purpose of illustration is a rectangular wood panel such as a door. As the saw is pushed across the workpiece W by handle 13 the rotating saw blade 11 projects downward through an opening in shoe 15 and cuts kerf K.

Considering the workpiece W to be a door supported in horizontal position on a table or saw horses the numeral 16 in FIG. 1 indicates the bottom edge of the door and the numeral 17 indicates one side edge. Thus the purpose of the illustrated sawing operation is to cut a strip 20 having a width indicated by dimension line 21 off the bottom edge of the door. Dimension line 21 measures the distance between the bottom edge 16 of the door and saw kerf K.

The stated purpose is accomplished by an inverted channel-shaped guide bar 25 having longitudinal slots 26 in its web portion between the two side flanges. Guide bar 25 is clamped to shoe 15 by a pair of lugs 27 and 28 engaging opposite ends of the shoe 25 which is rectangular in shape. These lugs are clamped by nuts 30 and 31 on bolts 32 and 33 which are slidable in slots 26 before the nuts are tightened. The bolts have square heads 34 and 35 contained in the channel of guide bar 25 to prevent rotation of the bolts. Lugs 27 and 28 are apertured to receive these bolts.

Lug 27 is elongated with its aperture between its opposite ends. As shown in FIG. 5 one end 36 bears against the top surface of guide bar 25 and its opposite end forms an ear 37 to bear against the top surface of shoe 15 with the intermediate portion of the lug inclined above the top surface of guide bar 25. Thus the lug 27 acts as a lever arm with the downward force of nut 30 acting in its mid portion to apply firm clamping pressure to the ear 37. Lug 27 also has a pin 38 projected into slot 26 to prevent rotation of the lug.

A conventional form of shoe 15 has upturned ends at 39 and the ear 37 is shaped to fit this contour. The length of lug 27 is appropriate to place the nut 30 a short distance away from shoe 15 to make the nut readily accessible and avoid conflict with certain parts on the leading side of the saw. Such saws are adjustable up and down to vary the depth of cut and may be tilted to cut a beveled edge and the nut 30 must be positioned to allow clearance for manipulation.

Lug 28 on the trailing side of the saw doesn't have this problem and so may be relatively short with its clamping ear 45 contained directly under the nut itself as shown in FIG. 5. If desired, means may also be provided to prevent rotation of this lug, such as a pin 46 to project into slot 26 in the manner of pin 38 on lug 27.

Slots 26 have two purposes. First, they provide for adjustment of the spacing between lugs 27 and 28 to fit shoes 15 of different dimensions and, second, the slots allow guide bar 25 to be shifted forward or backward relative to lugs 27 and 28 and shoe 15, as desired.

As will be apparent in FIG. 4, guide bar 25 may be shifted toward and away from saw blade 11 as indicated by arrows 50. This permits varying the dimension 21 from a small fraction of an inch to a distance of several inches, depending on the width of shoe 15. Since guide bar 25 is in direct contact with the end 16 of the panel, the desired dimension 21 will remain uniform along the entire length of edge 16. It is difficult to obtain such accuracy with a guide bar mounted on the workpiece or a guide track mounted on a table or other supporting structure for the workpiece. This accuracy and facility of adjustment can be obtained only by mounting the guide bar directly on the power saw itself.

In a similar manner the opposite end of the panel may be accurately trimmed, or the side edge 17, or the opposite side edge. It is not necessary to provide and try to accurately adjust a long guide rail extending the whole width or length of the workpiece. The invention is of the greatest advantage in trimming off very narrow strips hardly exceeding the width of the saw kerf.

The inventor has found that very few conventional saws of this type have the saw blade even remotely close to being parallel with the edge of shoe 15. To push the shoe 15 accurately along a straight edge of a workpiece is difficult if not impossible because the saw will creep sideways in proportion to the amount of the difference in alignment.

It is therefore suggested that there be provided a kit with strips of wood 12 inches in many different widths. If, for example, it is desired to trim one inch off the edge of a panel, a one inch strip is placed between the saw blade and guide 25 to position the guide truly parallel with the saw blade as nuts 30 and 31 are tightened. Thus the guide 25 provides a very accurate tool for the present purpose which is simple to use, light in weight and inexpensive to manufacture.

What is claimed is:

1. In an electric power hand saw having a shoe to support the saw for movement on the face of a workpiece, a guide bar arranged for sliding engagement with an edge of the workpiece, means for mounting said guide bar on said shoe in different adjusted positions, said different adjusted positions being parallel with the blade of the saw within a small range determined by the width of said shoe for trimming a narrow strip off a straight edge of a workpiece such as a wood panel, said mounting means comprising a pair of clamps on said guide bar engagable with the opposite ends of said shoe, said clamps being slidable across said ends of said shoe and slidable lengthwise on said guide bar for adjusting the position of the guide bar laterally and longitudinally in relation to the saw, each of said clamps comprising an apertured lug having an ear overlying said shoe, said guide bar underlying said shoe and having a longitudinal slot to receive a bolt through the aperture in each lug, at least one of said lugs being elongated with said ear on one end thereof and only the other end thereof bearing against said guide bar, said bolt extending through an intermediate portion of said lug to apply leverage on the clamping base of said ear, and means on said lugs engaging said slot in said guide bar to prevent rotation of the lugs on said guide bar.

2. A hand saw as defined in claim 1, said guide bar comprising a channel member.

3. A hand saw as defined in claim 2, said bolts having square heads in said channel to prevent rotation of the bolts, and nuts on said bolts bearing against said lugs.

4. For use with an electric power hand saw having a shoe to support the saw for movement on a face of a workpiece, a guide bar to enable the saw to trim a narrow strip off a straight edge of a workpiece such as a wood panel, said guide bar being slidable on the under face of said shoe to a position very close to and parallel with the blade of said saw, and means for clamping said guide bar in adjusted positions against said under face of the shoe, said clamping means comprising a pair of clamps on said guide bar slidable along opposite ends of said shoe, said clamps engaging the top surface of said shoe, said guide bar comprising a channel member having its web portion slidable on said shoe, and a longitudinal slot in said web portion receiving bolts for said clamps.

5. For use with an electric power hand saw having a shoe to support the saw for movement on a face of a workpiece, a guide bar to enable the saw to trim a narrow strip off a straight edge of a workpiece such as a wood panel, said guide bar being slidable on the under face of said shoe to a position very close to and parallel with the blade of said saw with the ends of the guide bar projecting beyond the opposite ends of said shoe, longitudinal slots in said projecting ends of the guide bar, clamp bolts slidable in said slots, and a pair of clamps slidable across said ends of the shoe for clamping said guide bar in adjusted positions against said under face of the shoe, each of said clamps comprising an apertured lug receiving one of said bolts and having an ear overlying one of said ends of the shoe.

* * * * *